United States Patent [19]
Epworth et al.

[11] Patent Number: 4,749,246
[45] Date of Patent: Jun. 7, 1988

[54] OPTICAL FIBER SENSORS

[75] Inventors: Richard E. Epworth, Bishop's Stortford; Roger J. Brambley, Great Dunmow, both of England

[73] Assignee: STC PLC, London, England

[21] Appl. No.: 59,239

[22] Filed: Jun. 10, 1987

Related U.S. Application Data

[63] Continuation of Ser. No. 706,309, Feb. 27, 1985, abandoned.

[30] Foreign Application Priority Data

Mar. 6, 1984 [GB] United Kingdom ............... 8405853

[51] Int. Cl.$^4$ .................................... G02B 6/26
[52] U.S. Cl. ............................ 350/96.15; 250/227; 350/96.19; 350/96.29
[58] Field of Search .............. 350/96.15, 96.19, 96.29; 250/227

[56] References Cited

U.S. PATENT DOCUMENTS

| | | | |
|---|---|---|---|
| 4,049,413 | 9/1977 | French | 65/3.15 |
| 4,253,727 | 3/1981 | Jeunhomme et al. | 350/96.15 |
| 4,268,116 | 5/1981 | Schmadel et al. | 350/96.29 |
| 4,294,513 | 10/1981 | Nelson et al. | 350/96.29 |
| 4,342,907 | 8/1982 | Macedo et al. | 250/227 |
| 4,449,210 | 5/1984 | Myer | 350/96.29 X |
| 4,472,628 | 9/1984 | Whitten | 250/227 |
| 4,477,725 | 10/1984 | Asawa et al. | 250/231 R |
| 4,530,078 | 7/1985 | Lagakos et al. | 350/96.29 X |
| 4,586,783 | 5/1986 | Campbell et al. | 350/96.15 |

FOREIGN PATENT DOCUMENTS

| | | |
|---|---|---|
| 082615 | 6/1983 | European Pat. Off. |
| 0082604 | 6/1983 | European Pat. Off. |
| 1460211 | 12/1976 | United Kingdom |
| 1531900 | 11/1978 | United Kingdom |
| 1536340 | 12/1978 | United Kingdom |
| 2125179 | 2/1984 | United Kingdom |

OTHER PUBLICATIONS

"Directional Couplers for Multimode Optical Fibres"; L. Jeunhomme and J. P. Pocholle; Applied Physics Letters; vol. 29, No. 8, Oct. 15th, 1976.

F. Gfeller, "Electroacoustic Transducers for Optical Fiber Modulator and Tap", IBM Technical Disclosure Bulletin, vol. 21, No. 2, Jul. 1978, pp. 813-814.

*Primary Examiner*—John Lee
*Attorney, Agent, or Firm*—Kerkam, Stowell, Kondracki & Clarke

[57] ABSTRACT

A distributed optical fiber sensor cable, for sensing perturbations such as pressure, comprises a length of optical fiber (10) and means adapted, in response to the perturbation to be sensed, to mechanically deform separate portions of the length of the fiber at sensing elements (11,12,13) periodically along their length in order to cause optical power launched into a mode of propagation in the core (14) and guided thereby to be coupled to an unguided mode, for example a cladding (15) mode. The coupling is optical wavelength selective and the separate sensing elements are each addressed with a different wavelength ($\lambda_{11}$, $\lambda_{12}$, $\lambda_{13}$) for spatial resolution along the length of the cable.

10 Claims, 3 Drawing Sheets

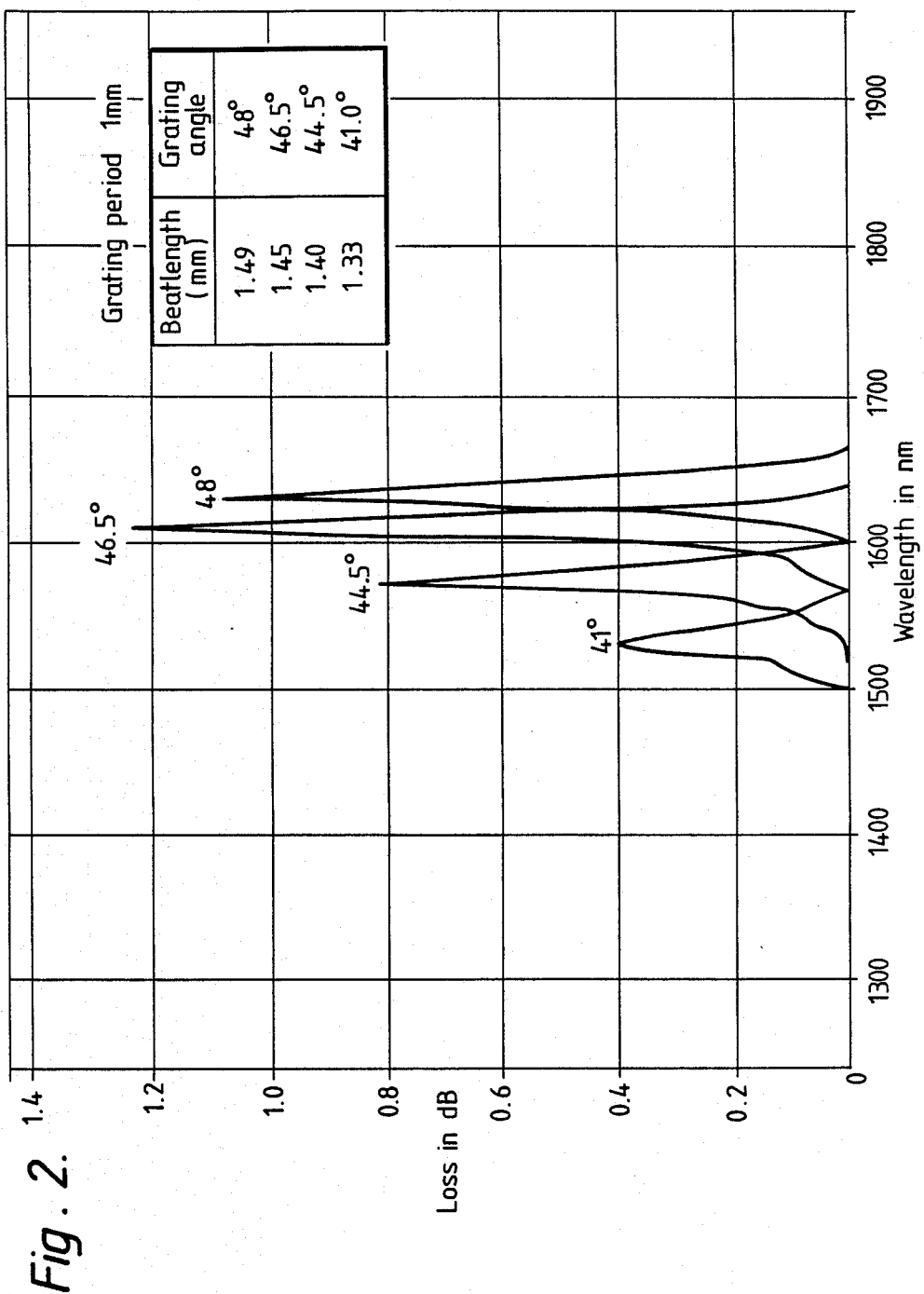

OPTICAL FIBER SENSORS

CROSS-REFERENCE TO RELATED APPLICATION

This is a continuation of co-pending application Ser. No. 706,309, filed Feb. 27, 1985, and now abandoned.

BACKGROUND OF THE INVENTION

This invention relates to optical fiber sensors and in particular to sensor structures employing optical fibers as sensing elements and to distributed optical fiber sensors.

SUMMARY OF THE INVENTION

According to one aspect of the present invention there is provided a distributed optical fiber sensor cable comprising an optical fiber, portions of which are adapted to provide sensing elements along its length, wherein at the sensing elements, in use of the cable, coupling of optical power occurs between a respective mode of propagation excited in the fiber and guided by the core of the optical fiber and a respective unguided mode or a group of closely matched unguided modes, which coupling is modulated in response to an external perturbation to be sensed acting on the sensing elements, and wherein coupling at each sensing element is achieved at respective optical wavelengths whereby the sensing elements can be spatially resolved along the length of the cable.

According to a further aspect of the present invention there is provided a sensor arrangement comprising a light source, a light detector and an optical fiber coupling the source and detector, wherein a plurality of portions of the optical fiber are adapted to provide sensing elements at which in use of the arrangement coupling occurs between optical power launched into a mode of the optical fiber and guided by the core of the optical fiber and an unguided mode or a group of closely matched unguided modes, which coupling is modulated in response to an external perturbation, to be sensed, acting on the sensing elements, and wherein coupling at each sensing element is achieved at respective optical wavelengths whereby the sensing elements can be spatially resolved along the length of the cable.

BRIEF DESCRIPTION OF THE DRAWINGS

Embodiments of the invention will now be described with reference to the accompanying drawings, in which:

FIG. 2 shows a plot of optical power loss from the core guided mode, subsequent to coupling (at resonance) to an unguided cladding mode, versus optical wavelength for four different grating angles $\theta$;

DESCRIPTION OF THE PREFERRED EMBODIMENTS

Optical fiber sensors offer a number of advantages over conventional sensors, including high sensitivity, intrinsic safety and immunity from electromagnetic interference.

The concepts of distributed fiber sensors are discussed in the specifications of our co-pending British Applications Nos. 8222371 (Ser. No. 2125572) and 8222372 (Ser. No. 2125179). These specifications describe the use of sections of fiber as distributed sensing elements. A disturbance to be sensed, for example pressure fluctuations due to an acoustic wave, is employed to cause coupling between separate "modes" of a fiber section through an appropriate transducer structure. By arranging for this coupling to be wavelength selective, different sections of the fiber can be addressed in parallel with different optical wavelengths. A single optical fiber can then act both as the sensing element(s) and as an information link to processing means. In the above-mentioned co-pending Applications three methods for realising the wavelength selective mode coupling are described, namely (a) coupling between two guided (by the core) modes of a conventional optical fiber, (b) coupling between two orthogonal polarisations of a single mode and (c) coupling between modes of two spatially separate structures, for example coaxial guides. The latter requires a more complex fiber design but offers the freedom to control both mode velocities and coupling independently.

Figure 5:
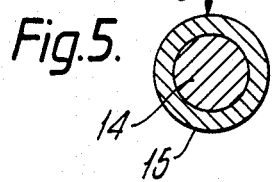
FIG. 5 shows a cross-section through the optical fiber.

We have now found that there is a fourth method, which fourth method involves coupling between guided and unguided modes, where "guided" means guided by the core 14 of an optical fiber 10 (FIG. 5), that is, for example, coupling between the fundamental mode of the core and either a single mode of the cladding 15 or a group of cladding modes. Whereas, when using readily available transmission fiber, good selectivity was not expected, in practice good wavelength selectivity can be achieved.

The spatial selectivity of a distributed fiber sensor is obtained by arranging for mode coupling to be wavelength dependent and by varying the required wavelength along the length of the sensor cable.

The optical fields of a mode fiber depend on distance z along the fiber according to the usual factor $\exp(i\beta z)$, where $\beta$, the propagation constant, is a function of both the wavelength and the mode in question. In an ideal straight fiber, all modes are completely uncoupled and propagate independently of each other. In any real fiber mode coupling, induced either by external deformation or internal geometry variations, can occur although, for a correctly designed and packaged communications fiber, the effect should be quite negligible. For a distributed fiber sensor we presently aim, however, to introduce coupling by deforming the fiber in a specific and controlled manner which can then be measured by, for example, monitoring the loss of power in the initial mode or the power induced in the second mode. As described in Application No. 8222371 the mode coupling is obtained by applying a spatially periodic deformation of a well-defined pitch so that the spatial frequency $2\pi/p$ of the deformation (where p=one longitudinal period of the deformation and matches the beat length between the two modes) matches the difference $\Delta\beta$ of the propagation constants of the initial and second modes. In general the propagation constants of the two modes will have different wavelength dependences and so $\Delta\beta$ will be wave length dependent. The beat length is the length of fiber over which the modes slip by one wavelength with respect to each other and is inversely proportional to $\Delta\beta$.

Whereas Application No. 8222371 refers to coupling between two transverse modes of a two-mode guide, the present invention is basically concerned with coupling between the guided mode (core mode) of a single mode fiber and lossy cladding modes, which latter type of coupling may be considered as a variant of the former type of coupling. The latter type of coupling may be monitored by observing the loss in the fundamental mode, that is the guided mode.

Figure 1:
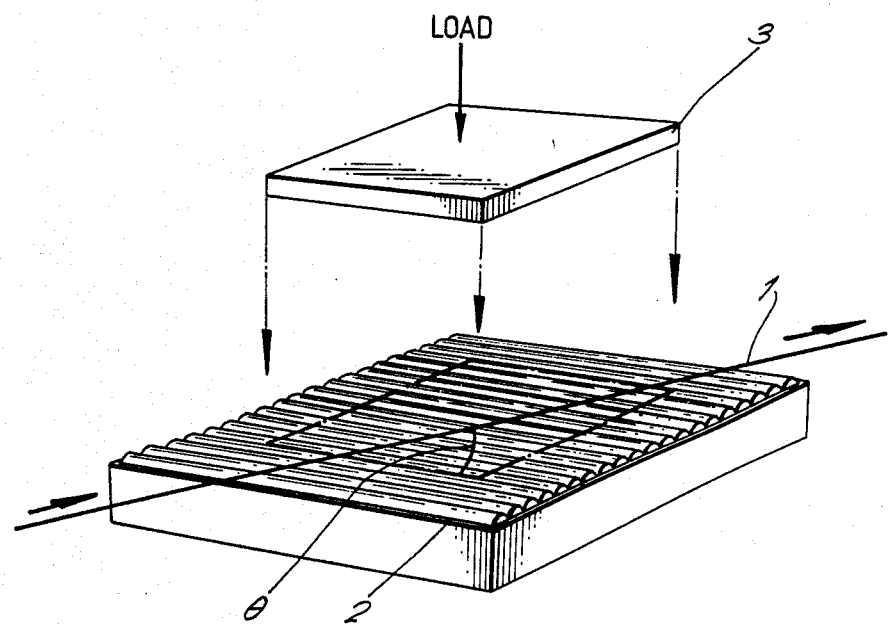
FIG. 1 shows a schematic of an experimental configuration for causing deformation of an optical fiber.

To verify that wavelength selectivity is indeed possible using the core-cladding coupling system, and to determine the available resolution and hence the number of channels, an experiment was performed. White light was passed through a monochromator whose resolution was around 2nm. The output from the monochromator was launched into a primary coated fiber 1 and the cladding light removed by immersing the fiber in a bath of index matching fluid. A coherent periodic perturbation was than applied to the fiber 1 by pressing it on a short grating 2 (FIG. 1) of, for example, 1 mm pitch and 50 mm length (that is fifty teeth). A pressure plate 3 with weights applied to it served to press the fiber onto the grating. In practical use of such a sensor, however, an external pressure to be sensed, for example, can serve to press the fiber onto the grating.

A load equivalent to a 20 gm loading on a 1 mm fiber was used. The fiber exiting from the perturbation applying arrangement was passed through a bath of index matching fluid in order to strip the cladding modes from the fiber. The power in the fundamental core mode was monitored in a detector whose output was applied to the y input of an x-y plotter. The x input of the plotter was fed by a signal from the monochromator representing the wavelength of the light employed.

Readings were taken by sweeping the wavelength for a number of different effective grating pitches which were obtained by rotating the grating so that it sat at different angles $\theta$ (see inset in FIG. 2) with respect to the fiber. The results are shown in FIG. 2. Each curve represents the results for a different grating pitch, that is it can be considered as representing the response of different sections of fiber each having an associated value of $\theta$. The coupling was considered to be to a single cladding mode in view of the good resolution of the peaks obtained and good wavelength selectivity (with about 20–30 nm peak width) was achieved.

Figure 3:
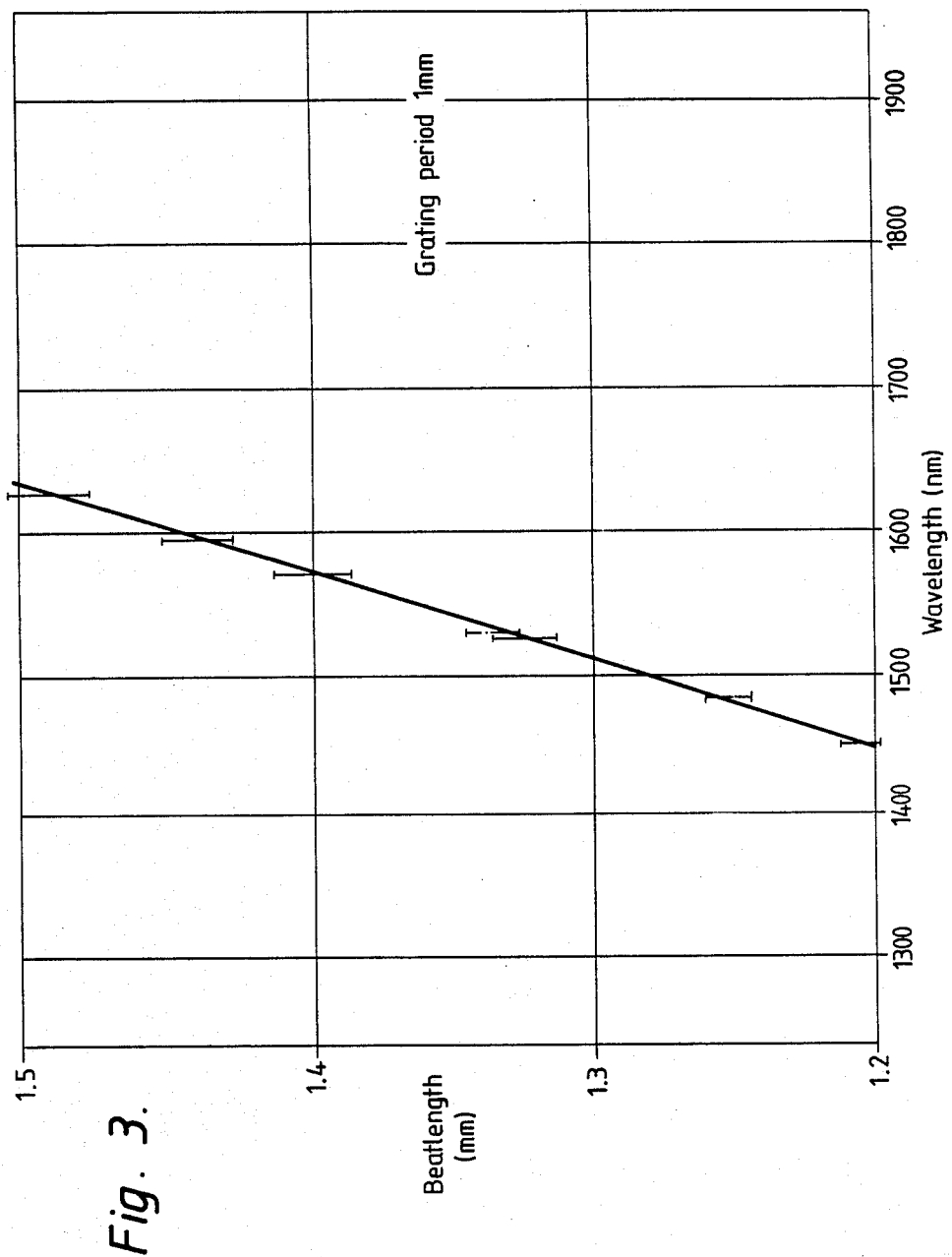
FIG. 3 shows a plot of beatlength versus wavelength.

FIG. 3 shows the wavelength selectivity in a way that emphasises the dispersive characteristic of coupling. It shows that beatlength, as determined by the resonance condition, varies linearly with wavelength. The wavelength selectivity achieved is so close to the limit set by the grating length, that coupling must be to a single mode, or to modes that have so similar dispersion characteristics that they can be considered a single mode. Moreover, this also suggests that a longer grating length would give proportionally narrower selectivity (about 2 nm for 0.7 m grating).

For high selectivity it is necessary to restrict coupling from the core mode to a single or tightly restricted group of cladding modes. By careful fiber design this situation can be attained. Also, by ensuring that the chosen cladding mode and the core mode have a good field match, a sensor with high sensitivity can be achieved.

Whereas the sensor structure described above employs the type of grating shown in FIG. 1 as part of the means for mechanically deforming the optical fiber, other deformations means may alternatively be used, for example, a cylindrical support whose diameter varies periodically along its length such as by machining or helically winding a suitably sectioned elongate element around a main cylindrical support. A sleeve holds the fiber on the support and the perturbation is applied to the sleeve. Examples of such arrangements being described in the above-mentioned co-pending Application No. 8222371. Also, whereas the invention has basically been described with reference to the detection of pressure variations, it is applicable to the sensing of any perturbing effect which can cause the required fiber deformation, for example vibration, or temperature, for example when using a high expansion coefficient former or grating, magnetic fields, for example when using a magnetostrictive sleeve.

Figure 4:
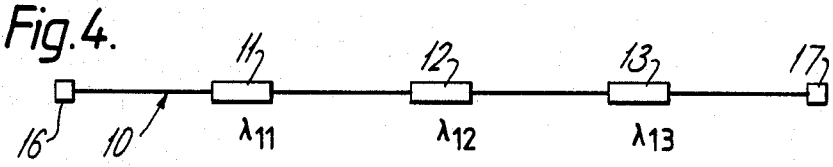
FIG. 4 shows schematically a distributed optical fiber sensor cable.

A distributed optical fiber sensor cable is shown schematically in FIG. 4. It comprises an optical fiber 10 which is adapted to provide sensing elements 11, 12 and 13, at each of which coupling of optical power between a mode of propagation guided in the core of the fiber and a respective unguided mode or a group of closely matched unguided modes occurs at a respective optical wavelength $\lambda_{11}$, $\lambda_{12}$, $\lambda_{13}$ whereby the sensing elements can be resolved along the length of the fiber 10. The fiber 10 is coupled between a light source 16 and a light detector 17.

We claim:

1. A distributed optical fiber sensor cable comprising:
   a single mode optical fiber;
   a plurality of means to provide spatially periodic mechanical deformation of respective portions of the fiber at spaced apart positions along its length, which portions and means define sensing elements;
   the mechanical deformation providing means being such as to deform the fiber portions in response to an external perturbation to be sensed;
   which fiber includes a core with cladding thereon and is able to support optical power in a mode of propagation guided in the core and in at least one unguided mode in the cladding;
   each sensing element being such that, upon mechanical deformation of the respective fiber portion, resonant coupling of optical power between the mode guided by the core and the at least one unguided mode is achieved thereat;
   the external perturbation serving to cause a spatially periodic mechanical deformation of the respective fiber portion along its length with a spatial period which matches the beat length between the guided and unguided modes at a respective optical wavelength;
   the extent of the coupling being determined by the magnitude of the external perturbation; and
   resonant coupling at each sensing element being achieved at a respective optical wavelength whereby the sensing elements can be spatially resolved along the length of the cable.

2. A sensor cable as claimed in claim 1, wherein each deformation providing means comprises a machined grating which serves to mechanically deform the respective portion of the fiber in response to an external perturbation to be sensed.

3. A sensor cable as claimed in claim 2, wherein the deformation providing means of the different sensing elements differ from one another.

4. A sensor cable as claimed in claim 1, wherein in use of the cable the extent of the power loss in the mode guided by the core, after coupling to the at least one unguided mode, provides a measure of the perturbation.

5. A sensor cable as claimed in claim 1, wherein in use of the cable the extent of the power induced in the at least one unguided mode, after coupling from the guided mode, comprises a measure of the perturbation.

6. A distributed optical fiber sensor comprising:
a wideband light source means whose optical output includes a plurality of different optical wavelengths;
light detector means to detect each of said plurality of different optical wavelengths;
a single mode optical fiber coupling the source means to the detector means;
a plurality of means to provide spatially periodic mechanical deformation of respective portions of the fiber at spaced apart positions along its length, which portions and means define sensing elements;
the mechanical deformation providing means being such as to deform the fiber portions in response to an external perturbation to be sensed;
which fiber includes a core with cladding thereon and is able to support optical power in a mode of propagation guided in the core and in at least one unguided mode in the cladding;
each sensing element being such that, upon mechanical deformation of the respective fiber portion, resonant coupling of optical power between the mode guided by the core and the at least one unguided mode is achieved thereat;
the external perturbation serving at a said sensing element to cause a spatially periodic mechanical deformation of the respective fiber portion along its length with a spatial period which mathces the beat length between the guided and unguided modes at a respective one of said plurality of different optical wavelengths;
the extent of the coupling being determined by the magnitude of the external perturbation;
and resonant coupling at each sensing element being achieved at a respective one of said plurality of different optical wavelengths whereby the sensing elements can be spatially resolved along the length of the fiber.

7. A sensor as claimed in claim 6, wherein in use the extent of power loss in the mode guided by the core, after coupling to the at least one unguided mode, provides a measure of the perturbation.

8. A sensor as claimed in claim 6, wherein in use the extent of the power induced in the at least one unguided mode, after coupling from the guided mode, comprises a measure of the perturbation.

9. A sensor as claimed in claim 6, wherein each deformation providing means comprises a machined grating which serves to mechanically deform the respective portion of the fiber in response to an external perturbation to be sensed.

10. A sensor as claimed in claim 9, wherein the deformation providing means of the different sensing elements differ from one another.

* * * * *